United States Patent
Park et al.

(10) Patent No.: US 8,170,089 B2
(45) Date of Patent: May 1, 2012

(54) APPARATUS FOR EQUALIZING CHANNEL IN FREQUENCY DOMAIN AND METHOD THEREFOR

(75) Inventors: Sung-Ik Park, Daejeon (KR); Seung-Won Kim, Daejeon (KR); Soo-In Lee, Daejeon (KR); Sang-Won Son, Busan (KR); You-Seok Lee, Busan (KR); Hyoung-Nam Kim, Busan (KR)

(73) Assignee: Electronics and Telecommunications Research Institute, Daejon (KR)

( * ) Notice: Subject to any disclaimer, the term of this patent is extended or adjusted under 35 U.S.C. 154(b) by 720 days.

(21) Appl. No.: 12/088,040

(22) PCT Filed: Dec. 26, 2005

(86) PCT No.: PCT/KR2005/004541
§ 371 (c)(1),
(2), (4) Date: Mar. 12, 2009

(87) PCT Pub. No.: WO2007/037576
PCT Pub. Date: Apr. 5, 2007

(65) Prior Publication Data
US 2009/0220035 A1     Sep. 3, 2009

(30) Foreign Application Priority Data
Sep. 29, 2005  (KR) .................. 10-2005-0091532

(51) Int. Cl.
*H03H 7/30*          (2006.01)
(52) U.S. Cl. ........ 375/229; 342/151; 375/143; 375/152; 375/343; 708/314
(58) Field of Classification Search .................. None
See application file for complete search history.

(56) References Cited

U.S. PATENT DOCUMENTS

| | | | |
|---|---|---|---|
| 5,533,063 A | 7/1996 | Mitra et al. | |
| 6,862,326 B1* | 3/2005 | Eran et al. | 375/343 |
| 7,773,700 B2* | 8/2010 | Kang et al. | 375/341 |
| 2011/0002242 A9* | 1/2011 | Perlow et al. | 370/278 |

OTHER PUBLICATIONS

Eduardo Abreu, et al; "Nonminimum Phase Channel Equalization Using Noncausal Filters", Acoustics, Speech, and Signal Processing, IEEE Transactions on Signal Processing, vol. 45, Issue 1, pp. 1-13, Jan. 1997.
Yiyan Wu, et al; "An ATSC DTV Receiver With Improved Robustness to Multipath and Distributed Transmission Environments", IEEE Transactions on Broadcasting, vol. 50, No. 1, pp. 32-41, Mar. 2004.
International Search Report mailed May 26, 2006 PCT/KR2005/004541.

* cited by examiner

*Primary Examiner* — David C. Payne
*Assistant Examiner* — Adolf Dsouza
(74) *Attorney, Agent, or Firm* — Ladas & Parry LLP

(57) ABSTRACT

Provided is an apparatus for channel equalization in frequency domain, including: a channel estimation unit for estimating a channel on received signal from outside, a channel matched filter for changing channel characteristic of the channel estimated by the channel estimation unit and the received signal to channel characteristic to meet condition required for noncausal filtering, a noncausal filter for changing the channel characteristic changed by the channel matched filter from nonminimum phase channel to minimum phase channel, a reverse channel calculation unit for calculating a reverse of the channel changed by the noncausal filter in frequency domain, and a frequency domain equalization unit for performing channel equalization with respect to the channel changed by the noncausal filter in the frequency domain by using the reverse obtained by the reverse channel calculation unit as coefficients of the frequency domain equalization apparatus.

9 Claims, 6 Drawing Sheets

APPARATUS FOR EQUALIZING CHANNEL IN FREQUENCY DOMAIN AND METHOD THEREFOR

TECHNICAL FIELD

The present invention relates to channel equalization techniques used in digital broadcasting reception systems, and more particularly, to an apparatus for channel equalization in frequency domain and a method thereof which are capable of stably acquiring a reverse of a changed channel by changing the channel status from nonminimum phase channel to minimum phase channel using a channel matched filter and a noncausal filter and enabling a stable equalization using the acquired reverse channel as equalizer coefficients in frequency domain.

BACKGROUND ART

In digital communication systems, since data is generally transmitted over a limited band, interference is occurred in adjacent symbols due to a time dispersion effect that allows pulse energy of symbols to be dispersed into adjacent symbol pulses. Besides, transmitted data is affected by a variety of channel distortions. This channel distortion phenomenon includes multi-path phenomenon, frequency offset, phase jitter and so on. This phenomenon causes InterSymbol Interference (ISI), implying that transmission symbols affect adjacent symbols in digital communication systems, which becomes a great obstacle in obtaining required data.

In particular, under Single Frequency Network (SFN) environment, there exists a boundary area where signals of diverse transmitters transmitted at a same frequency coexist with each other. Because the magnitude of signals from each transmitter is very similar in the boundary area, a big ghost may be occurred. Further, a ghost with very large time delay may be issued in the boundary area since the signals are simultaneously received from near and far transmitters. Due to issuance of such a ghost, there may be many cases that raise ISI most largely.

In order to prevent the above problem, a conventional receiver (digital broadcasting receiver) employs a channel equalizer to decrease symbol errors caused by ISI.

In communication channel, distortion factors as discussed above may be variable or fixable according to receiver circumstance. Typically, the digital broadcasting receivers mainly adopt an adaptive equalizer which adaptively updates tap coefficients according to time.

Now, a description will be given on a configuration of a conventional channel equalization device with reference to FIG. 1.

Especially, FIG. 1 illustrates a configuration of a general Decision Feedback Equalization (DFE) device.

As illustrated therein, in the general DFE device, a digital filter 11 removes ISI components that introduce distortions in a baseband signal received by a receiver (digital broadcasting receiver). At a symbol detector (simple quantizer) 12, a signal from the digital filter 11 is compared with a preset threshold to produce decision data.

Inputs to a tap coefficient updater 13 are an output signal of an equalizer input signal storage unit 17, an output signal of the digital filter 11, and error data selected by a switch 16, wherein an error is computed to update tap coefficients of the digital filter 11.

At a training sequence storage unit 14, a training data sequence that is also known by a transmitter (digital broadcasting transmitter) is stored therein. This training data sequence is read out in a training mode and provided to the tap coefficient updater 13.

At a statistical data calculator 15, a statistical error is calculated in a blind mode and forwarded to the tap coefficient updater 13.

At the switch 16, one of the outputs from the training sequence storage unit 14, the statistical data calculator 15 and the symbol detector 12 is selected in response to a selected mode and provided to the tap coefficient updater 13 as error data.

Then, at the tap coefficient updater 13, a corresponding error signal is derived; and data corresponding to the tap coefficients of the digital filter 11 is read out from the equalizer input signal storage unit 17 to update the tap coefficients. The updated tap coefficients are then delivered to the digital filter 11.

As the channel equalization device, this DFE device is widely used in digital broadcasting receivers. Typically, the DFE device has a structure that eye diagram of its output is open, which serves to precisely and easily make output signal decision as performance decision factor of the equalization device. Therefore, if an output of the symbol detector is a correctly decided symbol, a feedback filter is often utilized in the digital broadcasting receivers since there is no problem such as noise amplification phenomenon at output of the filter caused by a linear equalizer during the channel equalization while removing ISI by a previously decided symbol.

However, there exist many cases that it fails to open the eye diagram of the filter output under a multi-path environment having a ghost with a long time delay and with a size similar to that of a signal from a main path, like the SFN environment. If the eye diagram is not open, there is a very high possibility that raises decision error in the symbol detector. This brings about an error propagation problem that allows error decision to be accumulated through the feedback loop of the DFE apparatus.

To equalize communication channel under such a poor environment, there is a proposed method which changes channel characteristic of a received signal with a channel matched filter, wherein some degree of good performance is obtained, compared with the existing equalization device. However, this method also causes error propagation and fails to conduct stable equalization once decision error is taken place. This is disclosed in Y. Wu's proposal, entitled "An ATSC DTV Receiver with Improved Robustness to Multipath and Distributed Transmission Environments", IEEE Trans. Broadcasting, vol. 50, no. 1, pp. 32-41, March 2004.

The channel equalization method proposed by Y. Wu performs channel estimation by using over-sampled data and then provides a channel matched filter from the estimated channel information, wherein a fractionally-spaced equalization apparatus is used. However, since this method carries out over-sampling and fractionally-spaced equalization, the degree of complexity is very high. In addition, the method employs a simple quantizer (slicer) as symbol detector, which yields an error propagation problem by decision error.

Consequently, there has been a need for development of a new equalization device that can perform a more stable equalization while having low degree of complexity.

DISCLOSURE

Technical Problem

It is, therefore, an object of the present invention to provide an apparatus for channel equalization in frequency domain and a method thereof, which are capable of stably acquiring a reverse of a changed channel by changing the channel status from nonminimum phase channel to minimum phase channel using a channel matched filter and a noncausal filter and enabling a stable equalization using the acquired reverse channel as equalizer coefficients in frequency domain.

The other objectives and advantages of the invention will be understood by the following description and will also be appreciated by the embodiments of the invention more clearly. Further, the objectives and advantages of the invention will readily be seen that they can be realized by the means and its combination specified in the claims.

Technical Solution

In accordance with one aspect of the present invention, there is provided an apparatus for channel equalization in frequency domain, including: a channel estimation unit for estimating a channel on received signal from outside; a channel matched filter for changing channel characteristic of the channel estimated by the channel estimation unit and the received signal to channel characteristic to meet condition required for noncausal filtering; a noncausal filter for changing the channel characteristic changed by the channel matched filter from nonminimum phase channel to minimum phase channel; a reverse channel calculation unit for calculating a reverse of the channel changed by the noncausal filter in frequency domain; and a frequency domain equalization unit for performing channel equalization with respect to the channel changed by the noncausal filter in the frequency domain by using the reverse obtained by the reverse channel calculation unit as coefficients of the frequency domain equalization apparatus.

In accordance with another aspect of the present invention, there is provided a method for channel equalization in frequency domain, including the steps of: estimating a channel on received signal; changing channel characteristic of the estimated channel and the received signal to channel characteristic to meet condition required for construction of noncausal filter; changing the changed channel characteristic from nonminimum phase channel to minimum phase channel; calculating a reverse of the changed minimum phase channel in the frequency domain; and performing channel equalization with respect to the changed minimum phase channel in the frequency domain by using the calculated reverse as coefficients of frequency domain equalization apparatus.

As mentioned above, the present invention provides an apparatus for channel equalization in frequency domain and a method thereof using a channel matched filter and a noncausal filter, wherein channel status is changed from nonminimum phase channel to minimum phase channel to stably acquire a reverse of a changed channel. In order for the noncausal filter to operate properly, it is known that one condition is that an intensity of signal of the biggest ghost is at least 30% smaller than that of a signal of main path. The present invention employs the channel matched filter to meet the condition. The reverse of the channel changed by the above process is made in the frequency domain, wherein the value is adopted as coefficients of the frequency equalization apparatus as it is. Under very poor channel environment, the existing DFE apparatuses cause error propagation by incorrect decision, thereby performing instable equalization; and however, the present invention enables stable equalization.

Advantageous Effects

The present invention changes channel status using a channel matched filter and a noncausal filter to stably acquire a reverse of a changed channel used as coefficients of equalization apparatus. Thus, the present invention enables stable equalization, even for poor channels with no stable reverse.

In other words, the present invention stably acquires a reverse of a changed channel by changing the channel status from nonminimum phase channel to minimum phase channel using the channel matched filter and the noncausal filter and enabling stable equalization using the acquired reverse channel as equalizer coefficients in frequency domain.

Furthermore, the present invention performs calculation on a block basis and employs FFT during the equalization process, thus decreasing a relatively large amount of calculation as block (number of taps) is lengthened, compared with an equalization method in the time domain.

DESCRIPTION OF DRAWINGS

The above and other objects and features of the present invention will become apparent from the following description of the preferred embodiments given in conjunction with the accompanying drawings, in which.

BEST MODE FOR THE INVENTION

The above-mentioned objectives, features, and advantages will be more apparent by the following detailed description in association with the accompanying drawings; and thus, the invention will be readily conceived by those skilled in the art to which the invention pertains. Further, in the following description, well-known arts will not be described in detail if it seems that they could obscure the invention in unnecessary detail. Hereinafter, preferred embodiments of the present invention will be set forth in detail with reference to the accompanying drawings.

Figure 1:
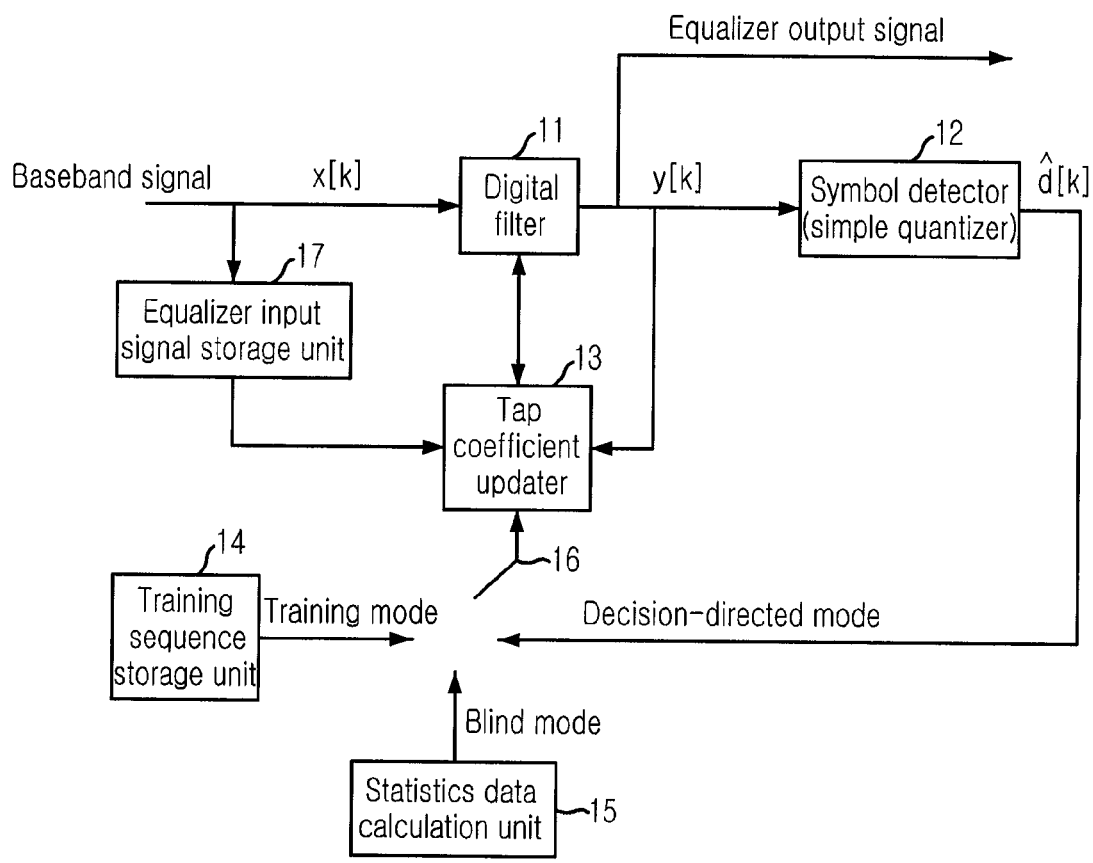
FIG. 1 illustrates a configuration of a general DFE apparatus.
Figure 2:
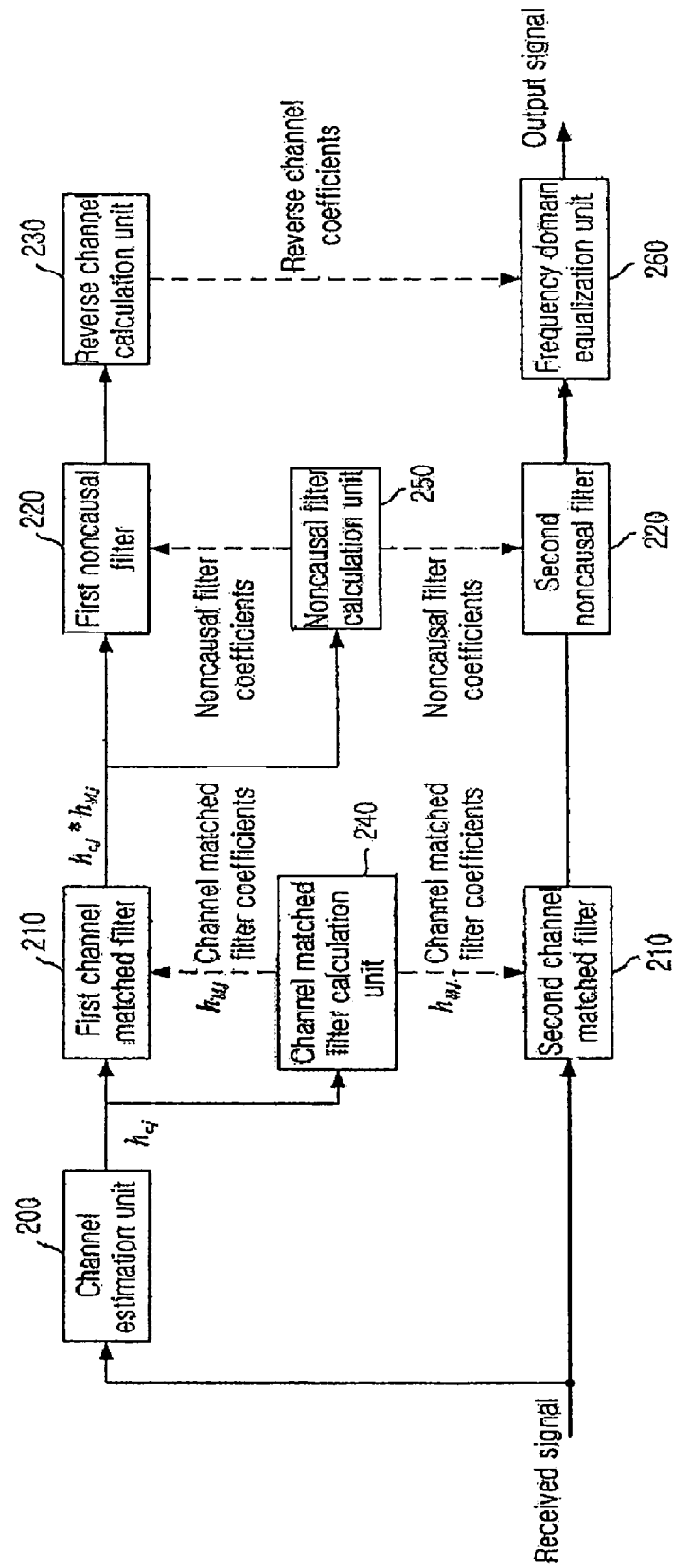
FIG. 2 is a block diagram illustrating a configuration of a frequency domain equalization apparatus in accordance with an embodiment of the present invention.

FIG. 2 is a block diagram illustrating a configuration of a frequency domain equalization apparatus in accordance with an embodiment of the present invention.

First, in order to help understanding the present invention, a description will be given on a structure and an operation of a frequency domain equalization apparatus having a channel matched filter and a noncausal filter in a terrestrial digital broadcasting reception system.

It needs to know channel characteristic to derive coefficients of the frequency domain equalization apparatus of Zero Forcing (ZF) way. As methods of estimating channel through a training sequence contained in a received signal, there are a method based on Least Square (LS), Matching Pursuit (MP) and correlation, a method using adaptive filter, etc. Among these methods, the LS and MP methods have to know accurate positions of a start portion and an end portion of the training sequence as well as needing much amount of calculation. Meanwhile, the method that uses the adaptive filter has to utilize a high speed algorithm such as Recursive Least Square (RLS) since a length of the training sequence is short. The aim of the present invention is to effectively perform channel equalization with estimated channel information. Therefore, the present invention allows users to adopt any desired channel estimation method according to the users' convenience. Hereinafter, there will be described one embodiment illustratively, in which a correlation-based channel estimation scheme capable of being implemented in simple manner is applied to a channel estimation unit 200. This scheme is simple, but needs a threshold to distinguish noises caused by jitter of correlation result from multi-path. This threshold may be varied depending on channel status and SNR, but obtained through simulation with respect to various channels and SNRs. The concrete value thereof will be mentioned later referring to FIG. 3.

Now, a configuration and an operation of the frequency domain equalization apparatus of the present invention will be described in detail with reference to FIG. 2.

As shown in FIG. 2, the frequency domain equalization apparatus of the present invention includes a channel estimation unit 200 for estimating a channel based on a received signal from outside and an internal training sequence, channel matched filters 210 and a channel matched filter calculation unit 240 for changing channel characteristic of the channel estimated by the channel estimation unit 200 and the received signal to channel characteristic to meet condition required for construction of noncausal filters 220, the noncausal filters 220 and a noncausal filter calculation unit 250 for changing the channel characteristic changed by the channel matched filters 210 and the channel matched filter calculation unit 240 from nonminimum phase channel to minimum phase channel, a reverse channel calculation unit 230 for calculating a reverse of the channel changed by the noncausal filters 220 and the noncausal filter calculation unit 250 in frequency domain, and a frequency domain equalization unit 260 for performing channel equalization in the frequency domain with respect to the channel changed by the noncausal filters 220 and the noncausal filter calculation unit 250 by using the reverse channel obtained by the reverse channel calculation unit 230 as coefficients of the frequency domain equalization apparatus.

Specifically, the channel matched filter calculation unit 240 calculates channel matched filter coefficients based on the channel coefficients estimated by the channel estimation unit 200. The channel matched filters 210 are provided with the first and second channel matched filters. At the first channel matched filter 210, channel characteristic of the channel estimated by the channel estimation unit 200 is changed to channel characteristic to meet condition required for construction of the noncausal filter 220 by using the channel matched filter coefficients derived by the channel matched filter calculation unit 240; and at the second channel matched filter 210, channel characteristic of the received signal is changed to channel characteristic to meet condition required for construction of the noncausal filter 220 with the channel matched filter coefficients derived by the channel matched filter calculating unit 240.

On the other hand, the noncausal filter calculation unit 250 calculates noncausal filter coefficients based on an impulse response of the first channel matched filter 210. The noncausal filters 220 are composed of the first noncausal filter and second noncausal filter. At the first noncausal filter 220, channel characteristic changed by the first channel matched filter 210 is changed from nonminimum phase channel to minimum phase channel by using the noncausal filter coefficients calculated by the noncausal filter calculation unit 250; and at the second noncausal filter 220, channel characteristic changed by the second channel matched filter 210 is changed from nonminimum phase channel to minimum phase channel with the noncausal filter coefficients calculated by the noncausal filter calculation unit 250.

Thereafter, a detailed description of the configuration and operation of the frequency domain equalization apparatus of the present invention will be given with reference to FIGS. 3 to 6.

Figure 3:
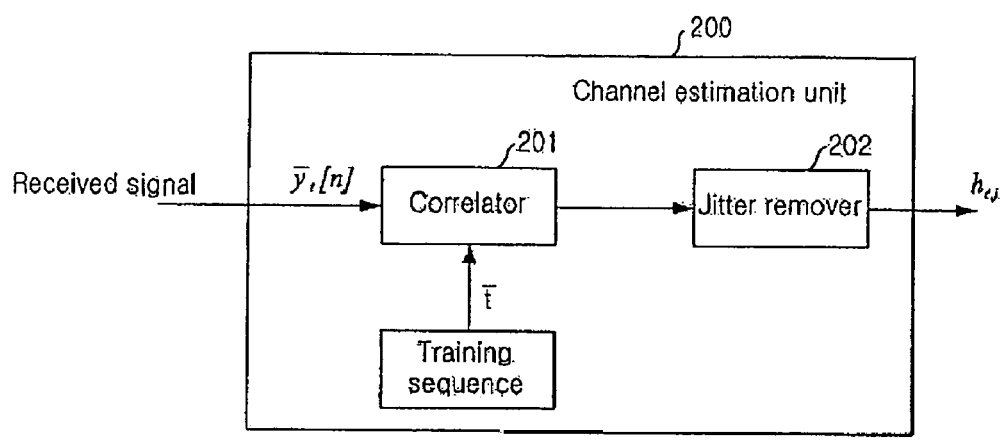
FIG. 3 illustrates a detailed block diagram of the channel estimation unit shown in FIG. 2.

FIG. 3 illustrates a detailed block diagram of the channel estimation unit 200 shown in FIG. 2.

As illustrated therein, the channel estimation unit 200 is provided with a correlator 201 for correlating an internal training sequence with a received signal from the outside, and a jitter remover 202 for accepting a correlation value (channel coefficient vector) processed by the correlator 201 and removing noises caused by jitter by using a threshold. Details of the channel estimation unit 200 will be provided below.

For example, it is first assumed that there exist a PN511 training sequence vector $\vec{t}=[t_0, t_1, \ldots, t_{510}]$ and a received signal vector $\vec{y}_r[n]=[y[n], y[n-1], \ldots, y[n-510]]$. Also, it is assumed that, after the two signals are passed through the correlator 201, its output value is $\vec{c}=[c_0, c_1, c_2, \ldots, c_{1020}]$. And then, the estimated channel coefficient vector $\vec{c}$ through the correlation is normalized to a value of the largest component so that channel coefficient of main path becomes 1. Next, since it is not easy to distinguish the multi-path due to the jitter, channel coefficients smaller than the threshold are all assigned 0 in the jitter remover 202. It is further assumed that components, which become 0 at both sides of the vector $\vec{c}$ after conducting channel estimation in such a way, are removed, and a new vector $\vec{h}_C$ consisting of remaining components is named as a channel coefficient vector whose components are $h_{C,0}, h_{C,1}, \ldots, h_{C,N-1}$.

At the channel estimation unit 200, the channel is estimated in the above-described manner or other manners. Next, tap coefficients of the channel matched filter 210 is derived by using the estimated channel coefficients at the channel matched filter calculation unit 240. One example thereof is as follows:

$$h_{M,j} = \sum_{i=0}^{N-1} h_{C,N-1-i}^* \cdot \delta[i-j], \quad j=0, 1, \ldots, N-1 \qquad \text{Eq. (1)}$$

wherein * denotes a complex conjugate. As a result, the tap coefficients $h_{M,j}$ of the channel matched filter 210 are obtained by symmetrizing the channel coefficients $h_{c,j}$ as mirror. Because of this process, the channel matched filter 210 is also called channel mirror filter.

On the other hand, it is assumed that an impulse response vector, which is made by combining a channel matched filter obtained by the channel matched filter calculation unit 240 with a channel estimated by the channel estimation unit 200 at a time index n, is $\vec{h}[n]$. Under the assumption, if the largest coefficient value in the vector $\vec{h}[n]$ is a pth component, the order of filter to be derived becomes p. At this time, a transfer function of the noncausal filter 220 is obtained by:

$$A(z) = \prod_{j=1}^{j} B_j(z) \quad \text{Eq. (2)}$$

wherein the impulse response A(z) of the noncausal filter 220 is repeatedly obtained; J is the number of repetition times; and $B_j(z)$ denotes all pass filter, which is obtained by the process as follows.

Coefficients of $B_1(z)$ may be computed based on $\vec{h}[n]$, which is an impulse response of a combined system of the estimated channel and the channel matched filter 210. The coefficients are computed by the following:

$$B_1(z) = \frac{\xi_1 h_P^*[n] + \sum_{i=1}^{P} h_{P-i}^*[n]z^{-i}}{\sum_{i=0}^{P-1} h_i[n]z^{-i} + \xi_1 h_P[n]z^{-P}} \quad \text{Eq. (3)}$$

wherein $h_i[n]$ indicates an ith component of $\vec{h}[n]$ and a scale factor $\zeta_1$ is multiplied by a value of $h_p[n]$ to make a stable filter in which $B_1(z)$ is operated at an inverted time by allowing all poles of $B_1(z)$ to be gone out to outside of unit circle. The scale factor $\zeta_1$ is represented by:

$$\xi_1 = \begin{cases} 1, & m_2 m_1 \leq \tau \\ \frac{m_2}{m_1}, & m_2/m_1 > \tau \end{cases} \quad \text{Eq. (4)}$$

wherein $m_1$ denotes a magnitude of $h_p[n]$, $m_2$ represents a magnitude of a secondly large coefficient in $\vec{h}[n]$, and $\tau$ stands for a threshold.

In Eq. (4) above, $\tau$ has a value of about 0.5.

If impulse response coefficients of the noncausal filter 220, which is obtained by Eqs. (3) and (4) above, are $g_1[i]$, $i=-\infty, \ldots, L-1$, then the transfer function of the noncausal filter 220 obtained through a single repetition is given by:

$$G_1(z) = \sum_{i=-\infty}^{L-1} g_1[i]z^{-1} \quad \text{Eq. (5)}$$

wherein $g_1[i]$ can be easily obtained from filter output that is derived by passing through $B_1^*(1/z^*)$ that is the noncausal filter 222 after time inversion of $h_i[n]$, and then turning back to an original forward time.

Using $g_1[i]$ obtained by Eq. (5) above, $B_2(z)$ may be derived by the second repetitive process as:

$$B_2(z) = \frac{\xi_2 g_1^*[0] + \sum_{i=1}^{\infty} g_1^*[-i]z^{-i}}{\sum_{i=-\infty}^{-1} g_1[-i]z^{-i} + \xi_2 g_1[0]} \quad \text{Eq. (6)}$$

where $\zeta_2$ is obtained in the same manner as Eq. (4) above.

$B_j(z)$, which is impulse response of the noncausal filter 220, may be also obtained in the same way as mentioned above, which is as follows:

$$B_j(z) = \frac{\xi_j g_{j-1}^*[0] + \sum_{i=1}^{\infty} g_{j-1}^*[-i]z^{-i}}{\sum_{i=-\infty}^{-1} g_{j-1}[-i]z^{-i} + \xi_j g_{j-1}[0]} \quad \text{Eq. (7)}$$

wherein, as can be seen from Eq. (7) above, $B_j(z)$ (i>1) has the order of infinity, but the order of multiplication $$\bigcirc_{j=1}^{J} B_j(z)$$

of z-region of filters becomes P. As mentioned above, the noncausal filter coefficients obtained by the noncausal filter calculation unit 250 are used as coefficients of the noncausal filter 220.

Figure 4:
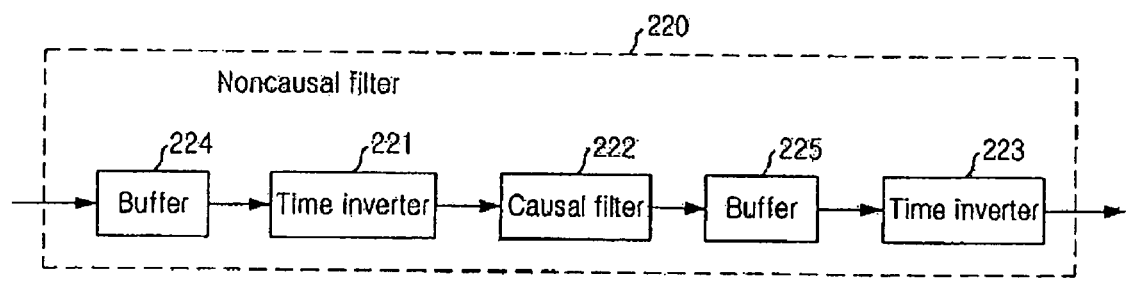
FIG. 4 exemplifies an equivalent block diagram of the noncausal filter shown in FIG. 2.

FIG. 4 exemplifies an equivalent block diagram of the noncausal filter 220 shown in FIG. 2.

As exemplified therein, the noncausal filter 220 includes a first buffer 224 for storing an output signal from the channel matched filter 210 on a block basis, a first time inverter 221 for time-inverting the signal buffered in the first buffer 224, a causal filter 222 for receiving and stably filtering a time-inverted signal from the first time inverter 221, a second buffer 225 for storing a signal filtered by the causal filter 222 again on a block basis, and a second time inverter 223 for time-inverting the signal buffered in the second buffer 223 again.

As configured above, the noncausal filter 220 needs the first time inverter 221 for time-inverting $\vec{h}[n]$ for its substantial implementation, wherein a time-inverted signal is passed through the causal filter 222. The output of the causal filter 222 is again passed through the second time inverter 213 to turn back to an original time domain signal, thereby obtaining a final output signal having such an effect as passing through the changed channel with minimum phase channel characteristic.

In the above process, the input signal of the noncausal filter 220 is passed through the time inverters 221 and 223; and thus, there is carried out a block-convolutional operation with the causal filter 222. The time inverters 221 and 223 require the buffers 224 and 225 that store some degree of data. The efficiency of the noncausal filter 220 is decided based on the length of the buffer, that is, the length of block to be stored.

If the length of block is considerably longer than that of the noncausal filter 220, the length of block becomes longer for time inversion thereof, thus requiring a large space of buffer and lengthening a time delay. Moreover, in case of time-variable channel, filter coefficients are estimated from a previous block; and therefore, if the length of block becomes longer, it does not follow the time-variable channel well. In contrast, if the length of block is shorter than that of the noncausal filter 220, the effect of the noncausal filter 220 is not perfectly reflected, which does not obtain required result.

As described above, the channel $h_{c,f}$ estimated by the channel estimation unit 200 has channel characteristic of minimum phase by passing through the noncausal filter calculation unit 250 by way of the channel matched filter 210 and the noncausal filter 220. To obtain a reverse of the estimated channel $h_{c,f}$, it is applied to the reverse channel calculation unit 230 as its input signal. An output signal of the reverse channel calculation unit 230 is obtained as:

$$W[n]_{,k} = \frac{1}{H_{NC}[n]_{,k}}, k = O, \ldots, L-1 \qquad \text{Eq. (8)}$$

wherein $H_{NC}[n]_{,k}$ is a signal that is obtained by zero-padding and Fourier-transforming an output signal $H_{NC}[n]_{,i}$ after the estimated channel is passed through the channel matched filter 210 and the noncausal filter 220 at a time index n so that its length becomes L. If the length of $H_{NC}[n]_{,i}$ is l, the length of zero padding becomes (L−1). The reason of doing the zero padding by the length of (L−1) is for the frequency domain equalization unit 260 to use the overlap-save method.

Figure 5:
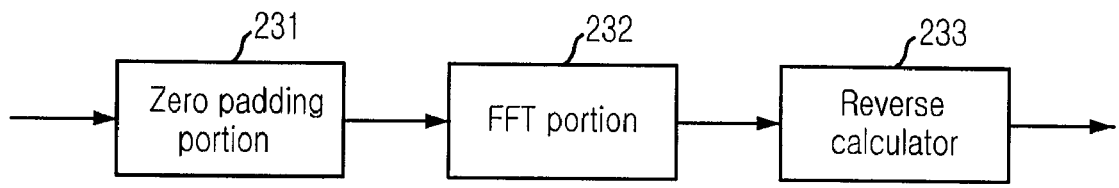
FIG. 5 illustrates a detailed block diagram of the reverse channel calculation unit shown in FIG. 2.

FIG. 5 illustrates a detailed block diagram of the reverse channel calculation unit 230 shown in FIG. 2.

As illustrated therein, the reverse channel calculation unit 230 includes a zero padding circuit 231 for zero-padding an output signal from the noncausal filter 220 in coefficients of the frequency domain equalization apparatus in the time domain for the frequency domain equalization unit 260 to use the overlap-save method, a Fast Fourier Transform (FFT) unit 232 for transforming a signal zero-padded by the zero padding circuit 231 into a corresponding frequency domain signal, and a reverse calculator 233 for taking a reverse of the frequency domain signal transformed by the FFT unit 232 in the frequency domain as it is to provide reverse channel coefficients to the frequency domain equalization unit 260.

As described above, the zero padding is made by the length L and then FFT is carried out to thereby obtain channel coefficients in the frequency domain. With the channel coefficients, the reverse of the channel is derived in the frequency domain by the reverse calculator 233.

In the foregoing description, the estimated channel is converted from channel with nonminimum phase characteristic to channel with minimum phase by using the channel matched filter 210 and the noncausal filter 220; and coefficients of the frequency domain equalization apparatus are obtained by the reverse channel calculation unit 230. In this case, in order to perform the frequency domain equalization with the obtained coefficients, the received signal should also be passed through the second channel matched filter 210 and the second noncausal filter 220 provided on the lower side of FIG. 2, as mentioned above.

On the other hand, the output of the reverse channel calculation unit 230 is used as coefficients of the frequency domain equalization unit 260; and an output vector signal $\vec{q}[n]$ equalized by the equalization unit is as follows:

$$\vec{q}[n] = IFFT[\vec{U}[n] \times \vec{W}[n]] \times [\vec{0}\ \vec{1}] \qquad \text{Eq. (9)}$$

wherein $[\vec{0}\ \vec{1}]$ in vector $\vec{0}, \vec{1}$ are vectors composed of 0 and 1, respectively, and lengths thereof are (L−1) and (L−1+1), respectively. And, IFFT indicates an Inverse FFT, and an operator x denotes an operation that makes a vector with same magnitude after multiplying respective components of the two vectors. $\vec{U}[n]$ is a vector which is made by first collecting L number of signals passed through the channel matched filter 210 and the noncausal filter 220, and then transforming the same into a frequency domain. Eq. (9) above implies a multiplication of the input signal and the equalizer coefficients in the frequency domain, and a circular convolution in the time domain. Accordingly, an overlapping of signal is occurred in view of characteristic of circular convolution; and therefore, the overlap-save method that uses only portion with no overlap after multiplying vectors $\vec{0}, \vec{1}$ is adopted. In other words, only portion where $\vec{1}$ is multiplied is used.

Figure 6:
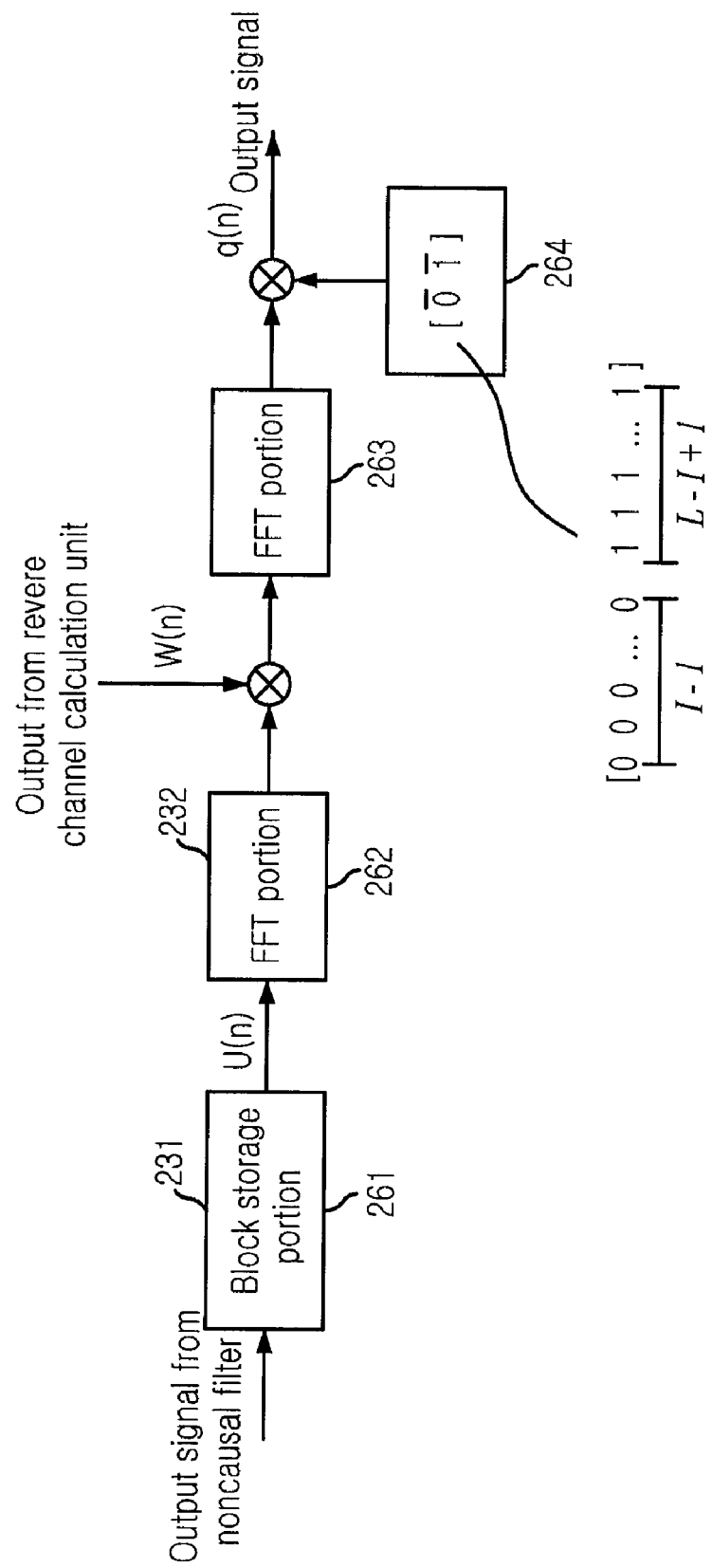
FIG. 6 exemplifies a detailed block diagram of the frequency domain equalization unit shown in FIG. 2.

FIG. 6 exemplifies a detailed block diagram of the frequency domain equalization unit 260 shown in FIG. 2.

As exemplified therein, the frequency domain equalization unit 260 includes a block storage portion 261 for storing the signal passed through the noncausal filter 220 by its length of the reverse channel calculation unit 230 to use the overlap-save method, an FFT portion 262 for transforming an output signal from the block storage portion 261 into a corresponding frequency domain signal, a first multiplier for multiplying the frequency domain signal from the FFT portion 262 by the output signal (reverse channel coefficients) from the reverse channel calculation unit 230, an IFFT portion 263 for transforming a frequency domain signal from the first multiplier back into the original time domain signal, and a second multiplier for multiplying the original time domain signal from the IFFT portion 263 by the vector $[\vec{0}\ \vec{1}]$ 264 to remove a portion that overlaps in circular-convolution operated signal by multiplication operation from the time domain signal.

As described above, the output signal of the noncausal filter 220 is stored in the block storage portion 221 and then Fourier transformed. Thereafter, the FFT-processed signal is multiplied by the output signal of the reverse channel calculation unit 230 and then IFFT-processed to obtain the time domain signal. Next, an output vector signal is derived by multiplying it by the vector with $\vec{0}$ and $\vec{1}$.

Figure 7:
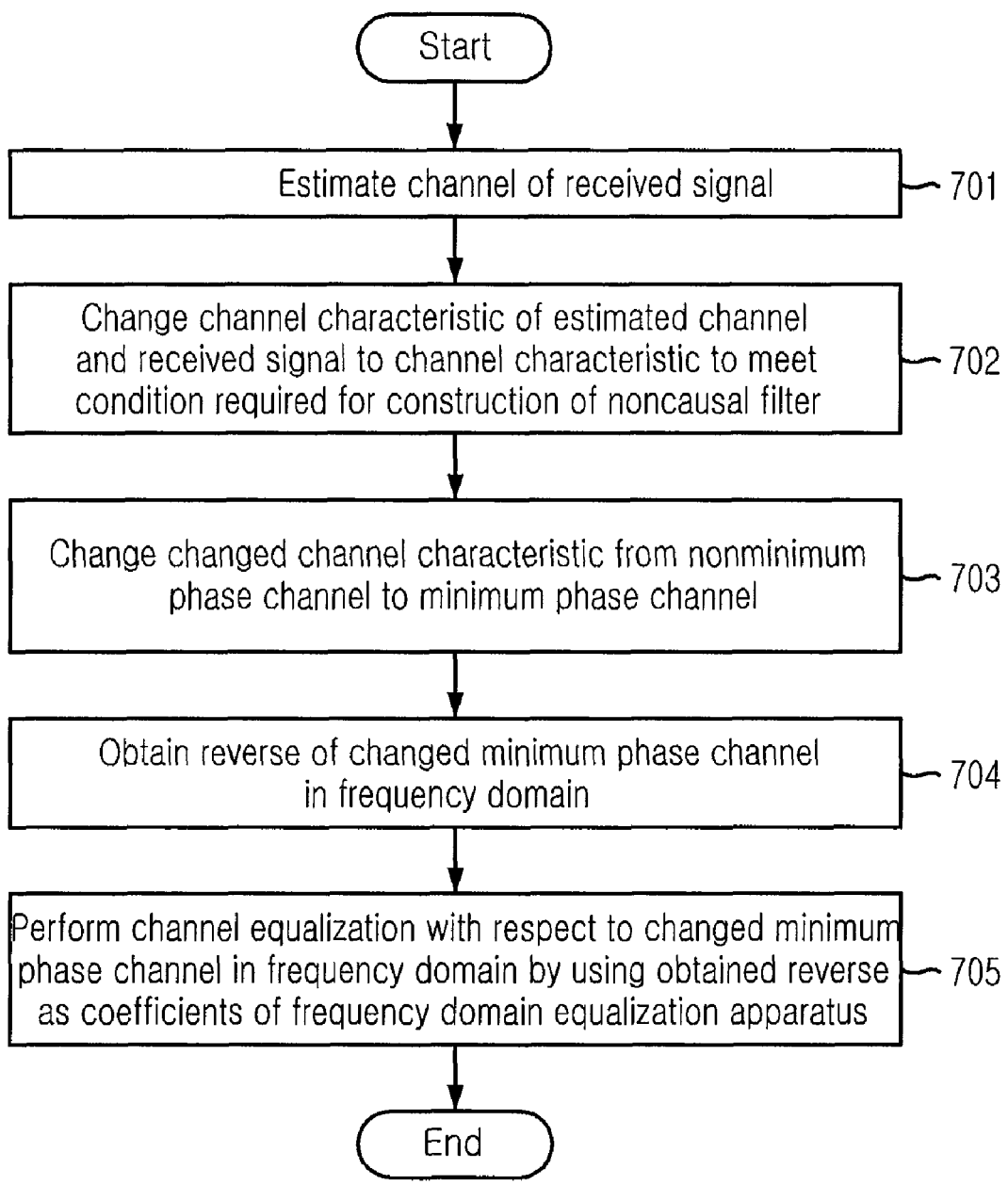
FIG. 7 shows a flowchart for describing a frequency domain equalization method in accordance with an embodiment of the present invention.

FIG. 7 shows a flowchart for describing a frequency domain equalization method in accordance with an embodiment of the present invention. A detailed operation of the method is the same as mentioned above; and therefore, only core operation will be briefly described below.

First, the process of the present invention estimates a channel through a received signal and a training sequence at step 701.

At a subsequent step 702, the process changes the channel characteristic of the estimated channel and the received signal to channel characteristic to meet condition required for construction of the noncausal filter.

Next, the process changes the changed channel characteristic from nonminimum phase channel to minimum phase channel at step 703.

Thereafter, the process derives a reverse of the changed minimum phase channel in the frequency domain at step 704.

At a final step 705, the process performs the channel equalization with respect to the changed minimum phase channel in the frequency domain by using the derived reverse as coefficients of the frequency domain equalization apparatus.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

While the present invention has been described with respect to certain preferred embodiments, it will be apparent to those skilled in the art that various changes and modifications may be made without departing from the scope of the invention as defined in the following claims.

What is claimed is:

1. An apparatus for channel equalization in frequency domain, comprising:
   a channel estimating means for estimating a channel on received signal from outside;
   a channel matched filtering means for changing channel characteristic of the channel estimated by the channel estimating means and the received signal to channel characteristic to meet a condition required for noncausal filtering;

a noncausal filtering means for changing the channel characteristic changed by the channel matched filtering means from nonminimum phase channel to minimum phase channel;

a reverse channel calculating means for calculating a reverse of the channel changed by the noncausal filtering means in the frequency domain; and a frequency domain equalization means for performing channel equalization with respect to the channel changed by the noncausal filtering means in the frequency domain by using the reverse obtained by the reverse channel calculating means as coefficients of the frequency domain equalization apparatus, wherein the channel matched filtering means includes:

a channel matched filter calculation unit for calculating channel matched filter coefficients based on the channel coefficient estimated by the channel estimating means;

a first channel matched filter for changing channel characteristic of the channel estimated by the channel estimating means to channel characteristic to meet condition required for noncausal filtering by using the channel matched filter coefficients obtained by the channel matched filter calculation unit; and a second channel matched filter for changing channel characteristic of the received signal to channel characteristic to meet condition required for noncausal filtering by using the channel matched filter coefficients obtained by the channel matched filter calculation unit.

2. The apparatus as recited in claim 1, wherein the noncausal filtering means includes:

a noncausal filter calculation unit for calculating noncausal filter coefficients based on an impulse response of the first channel matched filter;

a first noncausal filter for changing channel characteristic changed by the first channel matched filter from nonminimum phase channel to minimum phase channel by using the noncausal filter coefficients calculated by the noncausal filter calculation unit; and a second noncausal filter for changing channel characteristic changed by the second channel matched filter from nonminimum phase channel to minimum phase channel by using the noncausal filter coefficients calculated by the noncausal filter calculation unit.

3. The apparatus as recited in claim 2, wherein each of the first and second noncausal filters includes:

a first storage means for storing an output signal from the first or second channel matched filter on a block basis;

a first time inverter for time-inverting the signal stored in the first storage means;

a causal filter for receiving and stably filtering a time-inverted signal from the first time inverter;

a second storage means for storing a signal filtered by the causal filter on a block basis; and a second time inverter for time-inverting the signal stored in the second storage means.

4. The apparatus as recited in claim 1, wherein the channel estimating means includes:

a correlator for correlating an internal training sequence with the received signal from the outside; and a jitter remover for accepting a correlation value or channel coefficient vector processed by the correlator and removing noises caused by jitter by using a threshold.

5. The apparatus as recited in claim 1, wherein the channel estimating means estimates a channel using one of an adaptive filtering technique, a least square technique, and a matching pursuit technique.

6. An apparatus for channel equalization in frequency domain, comprising:

a channel estimating means for estimating a channel on received signal from outside;

a channel matched filtering means for changing channel characteristic of the channel estimated by the channel estimating means and the received signal to channel characteristic to meet a condition required for noncausal filtering;

a noncausal filtering means for changing the channel characteristic changed by the channel matched filtering means from nonminimum phase channel to minimum phase channel;

a reverse channel calculating means for calculating a reverse of the channel changed by the noncausal filtering means in the frequency domain; and a frequency domain equalization means for performing channel equalization with respect to the channel changed by the noncausal filtering means in the frequency domain by using the reverse obtained by the reverse channel calculating means as coefficients of the frequency domain equalization apparatus, wherein the reverse channel calculation means includes:

a zero padding block for zero-padding an output signal from the noncausal filtering means to frequency domain equalization coefficients in time domain for the frequency domain equalization means to use an overlap-save method;

a Fast Fourier Transform (FFT) block for transforming a signal zero-padded by the zero padding block into a corresponding frequency domain signal; and a reverse calculator for taking a reverse of the frequency domain signal transformed by the FFT block in the frequency domain to provide reverse channel coefficients to the frequency domain equalization means.

7. An apparatus for channel equalization in frequency domain, comprising:

a channel estimating means for estimating a channel on received signal from outside;

a channel matched filtering means for changing channel characteristic of the channel estimated by the channel estimating means and the received signal to channel characteristic to meet a condition required for noncausal filtering;

a noncausal filtering means for changing the channel characteristic changed by the channel matched filtering means from nonminimum phase channel to minimum phase channel;

a reverse channel calculating means for calculating a reverse of the channel changed by the noncausal filtering means in the frequency domain; and a frequency domain equalization means for performing channel equalization with respect to the channel changed by the noncausal filtering means in the frequency domain by using the reverse obtained by the reverse channel calculating means as coefficients of the frequency domain equalization apparatus, wherein the frequency domain equalization means includes:

a block storing portion for storing the signal passed through the noncausal filtering means by a signal length of the reverse channel calculation means to use the overlap-save method;

an FFT portion for transforming an output signal from the block storing portion into a corresponding frequency domain signal;

a first multiplier for multiplying the frequency domain signal from the FFT portion by the output signal or reverse channel coefficients from the reverse channel calculation means or dechannel coefficients;

an Inverse FFT (IFFT) portion for transforming a frequency domain signal from the first multiplier back into the original time domain signal; and a second multiplier for multiplying the time domain signal from the IFFT portion by a vector $[\vec{0} \ \vec{1}]$ to remove a portion that overlaps in circular-convolution operated signal by multiplication operation from the time domain signal.

8. A method for channel equalization in frequency domain, comprising the steps of:

estimating a channel on received signal;

calculating channel matched filter coefficients based on an estimated channel coefficient;

changing channel characteristic of the estimated channel with a first channel matched filter and the received signal with a second channel matched filter to channel characteristic to meet a condition required for construction of noncausal filter by using the channel matched filter coefficients;

changing the changed channel characteristic from nonminimum phase channel to minimum phase channel;

calculating a reverse of the changed minimum phase channel in the frequency domain; and performing channel equalization with respect to the changed minimum phase channel in the frequency domain by using the calculated reverse as coefficients of frequency domain equalization apparatus.

9. An apparatus for channel equalization in frequency domain, comprising:

a channel estimating means for estimating a channel on received signal from outside;

a channel matched filtering means for changing channel characteristic of the channel estimated by the channel estimating means and the received signal to channel characteristic to meet a condition required for noncausal filtering;

a noncausal filtering means for changing the channel characteristic changed by the channel matched filtering means from nonminimum phase channel to minimum phase channel;

a reverse channel calculating means for calculating a reverse of the channel changed by the noncausal filtering means in the frequency domain; and a frequency domain equalization means for performing channel equalization with respect to the channel changed by the noncausal filtering means in the frequency domain by using the reverse obtained by the reverse channel calculating means as coefficients of the frequency domain equalization apparatus, wherein the channel matched filtering means comprises a channel matched filter calculation unit and first and second channel matched filters meeting a condition required for noncausal filtering.

* * * * *